Nov. 17, 1953  H. G. MARVIN  2,659,398
KERF PLANING SAW
Filed June 8, 1951
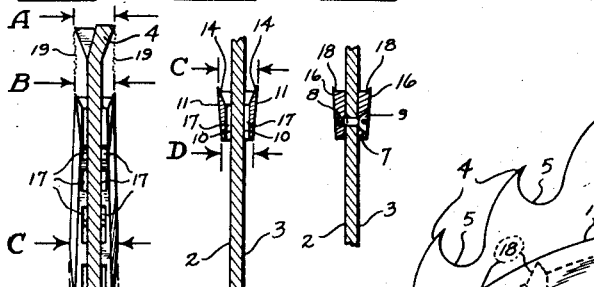
Fig. 2. Fig. 3. Fig. 4.
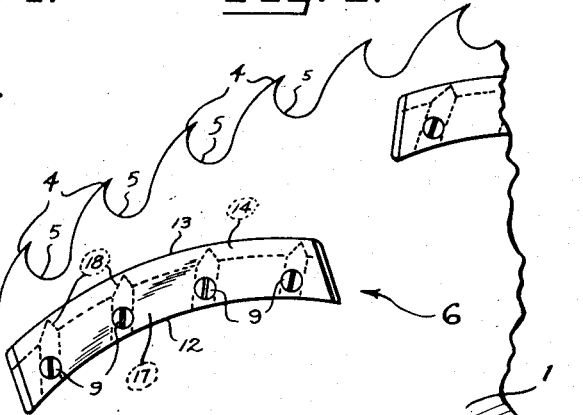
Fig. 1.
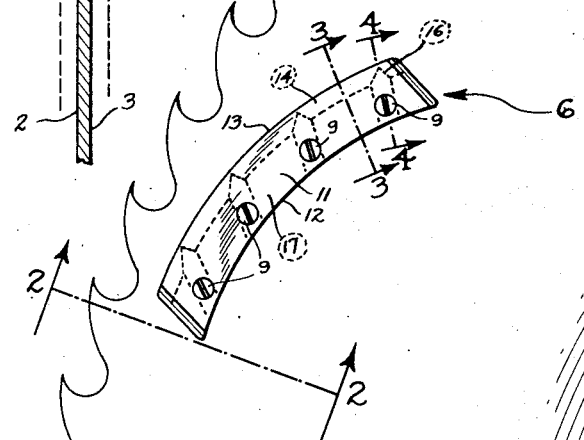
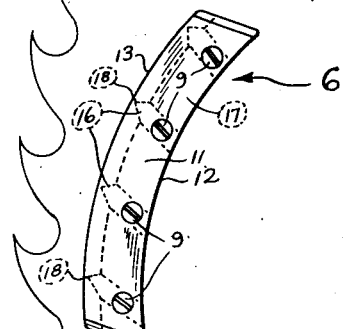
INVENTOR.
Hervey G. Marvin
BY
Atty.

Patented Nov. 17, 1953

2,659,398

UNITED STATES PATENT OFFICE 2,659,398

KERF PLANING SAW

Hervey G. Marvin, Molalla, Oreg.

Application June 8, 1951, Serial No. 230,559

8 Claims. (Cl. 143—140)

This invention relates to a planer blade for use with a circular wood saw. More specifically, a multiplicity of these planer blades are employed in mated pairs. The blade pairs are detachably mounted inboard of the peripheral teeth on a circular saw to plane the sides of the rough kerf cut by the saw teeth. Thus, in one continuous operation, using a sawmill as exemplary, a log can be rough-sawed and planed to produce a surface comparable to the planed surface found upon finished lumber.

Having in mind the fact that planer blades intended for a similar use hitherto have been tried and found wanting in certain structural provisions, it is one object of my invention to improve upon these prior blades. In particular, my improvements will be directed toward the quality of the planing action, the speed of operation or rate of feed of the saw, and the provision, together with the saw face, for a continuous discharge of the shavings and other debris resulting from the use of my blades.

It is the Pacific Northwest Douglas fir region which is the lumber capital of the world. In this region, sawmill and allied lumber-producing operations generally may be divided into two main classifications. Thus, there are first the large lumber manufacturing plants having a daily production capacity of 150,000 to 1,000,000 or more board feet. These plants are equipped for elaborate operations and may include a sawmill proper, sorting and grading tables and sheds, complex internal transportation systems, dry kilns, a seasoning yard, storage sheds and yards, edging, trimming, surfacing and planing mills, lath-forming machinery, shipping spurs, a power plant, and even, in some instances, a plywood mill and/or a box factory. In short, this first classification includes the giants in the industry as defined by their two-fold purpose of securing increased profits from the sale of the more finished wood products and of manufacturing by-products from those raw materials which otherwise would be discarded or burned.

Secondly, the Douglas fir region abounds in literally thousands of small sawmills, known to the trade as "gyppo outfits." These latter mills work with a limited crew and require but a relatively small capital investment. Further, many utilize a semiportable set up better to accommodate the inevitable movement of the rig to a fresh site when the land in one area is logged off. As is to be expected, the usual "gyppo" operator employs but limited production facilities and often works with a stand of second-growth timber. Thus, his capacity usually is less than 100,000 board feet per day and all or a majority of this capacity is concentrated upon the production of cants, rough structural timbers, or rough green lumber. My invention is intended to be of primary utility to the sawmill operators of this second classification.

The modern "gyppo" operator, working primarily with Douglas fir, is engaged in a highly competitive business. His output of green lumber or rough-sawed logs, termed "cants," usually is sold by bid or contract to a finishing mill. Thus, his facilities often are limited to one circular head saw and his profit margin is squeezed between the combined cost of the timber stand and labor, and the sale price of a rough-cut product. Obviously, planed or smooth-sawed cants and resaws would mean an increased profit. The small operator, however, cannot afford to tie up his limited capital funds in planing, kiln dry, and smooth-saw facilities. To remedy this situation and to permit the production of a smooth-surfaced stock by the "gyppo" sawmills, then, is a prime object of my invention.

To this end, attempts have hitherto been made to combine a plane or surfacer with a conventional circular head saw, the theory being that the plane would clean and smooth the sides of the rough kerf as it is cut by the head saw teeth. However, experience has shown that previous attempts in this direction either have ended in failure or have proved to be of limited commercial practicality. Thus, planer blades or bits for circular saws generally are not new. Their development can be traced back prior to 1867 (see United States Patent 60,827 issued in 1867 to Bee). In spite of the early development of this field, however, no commercially feasible, functionally correct structure hitherto has been made available to the sawmill industry. Some planer blades have not been properly placed with respect to the saw teeth or else the expense of their complex construction has priced them off the market. Other blades slice such a wide kerf that a goodly portion of the log is wasted. This, too, is impractical commercially. Still other blades project laterally in gauge productive sharp points or sharp blade tips with the result that an excess power, beyond that available at a "gyppo outfit," is consumed in driving the head saw. Yet others tend to unbalance the delicate saw mechanism, to create excess friction, to heat the saw blade, to run untrue, or to wear unduly fast.

Having in mind the above listed disadvantages of these prior attempts, I have turned my inventive efforts toward the provision of an improved planer blade structure, such structure to be of particular utility in increasing the profit margin for the small sawmill operators of the Pacific Norhtwest.

In summary, my improved planer blades are secured to the opposite faces of the circular saw by simple, flush-type bolts or the equivalent. Thus, each blade is simple to install, is adapted to fit any standard circular saw, and is replaceable with a minimum of effort when it becomes dull or broken. Further, the body and cutting edge of each of my blades is formed on a tapered arc disposed at an oblique angle to the direction of saw travel. These factors, in combination, reduce the overall width of the kerf, the heating of the saw blade and the power required to turn the saw. The individual planer blades, on the other hand, are used in mated pairs, the members of each pair being allochiral and being oppositely located to balance the saw and insure a true run. Additionally, many of the above listed advantages are enhanced and served yet further by another novel element of my invention. Thus, each blade includes a plane outer face and a nonplaner inner face. These faces meet radially in a tapered cutting or slicing blade. Projecting laterally outward from the inner face, I provide a series of elongated straight cutter bits. These cutter bits serve several functions. Firstly, they protrude sufficiently to space the body of the planer blade from the face of the saw. Thus, a plurality of lateral discharge tunnels are formed and are bounded intermediate the bits, the planer blade inner face, and the saw face. Each such tunnel opens radially in from adjacent the arcuate slicing blade to the base of the plane in position to dispose of the shavings, chips, etc., generated by the working of the planer blade. In addition, each bit terminates in a pointed tip closely underlying the slicing blade. In sequence then, the circular saw teeth cut a rough kerf and gather a majority of the sawdust therefrom, the leading edge of the planer blade cleans the kerf, the slicing blade shaves or planes the kerf smooth, the shaving is cut into short lengths by the tips of the bits, and the cut shavings and cleaning debris are discharged radially down through the tunnels. The cooperative structure effecting this sequential function is the subject matter of the instant invention, and the prime object thereof is directed toward an increased output of an improved, smooth-surfaced stock for the aforementioned small sawmills.

A further object of my invention is to provide an elongated arcuate planer blade having a body which tapers longitudinally from end to end and laterally from side to side, whereby the slicing and cleaning action thereof materially is increased.

Yet another object of my invention is to arrange a multiplicity of mated pairs of planer blades circumferentially about a circular saw blade so the kerf which is cut by the saw teeth continuously is cleaned and surfaced by the planer blades as the log or cant is fed past the saw. In further service of this same object, I arranged each blade, each series of discharge tunnels, and each set of correlated cutter bits all at an oblique angle to the direction of saw travel. Thus, the aforementioned continuous surfacing function is accomplished with a minimum power consumption and with a reduced propensity for overheating the saw blade.

As this specification unfolds, those skilled in the saw art will recognize that the above described objects and advantages are generic to all circular wood saws. Thus, it is deemed sufficient in the following detailed description, to describe other and further inventive objects and advantages with reference to the small sawmills of the Douglas fir region and with reference to the accompanying drawing, wherein:

Fig. 1 illustrates an approximate quarter section of a conventional circular wood saw together with a plurality of my novel planer blades secured circumferentially thereto;

Fig. 2 is a section view, taken substantially on the line 2—2 of Fig. 1, showing the circular saw and one of the planer blades of Fig. 1 as they appear in operation, while cutting a rough kerf and planing the sides thereof;

Fig. 3 is a detail view, taken substantially on the line 3—3 of Fig. 1, showing the lateral taper of the planer blade, from side to side, and indicating the structure of one of the discharge tunnels which lead from the cutting edge of the blade radially inward; and Fig. 4 is a detail section view, taken through one of the cutter bits substantially on the line 4—4 of Fig. 1, showing the manner in which the allochiral, mated pairs of planer blades are secured to the opposite faces of the circular saw.

As previously explained, this invention is generic to all circular wood saws. To this end, I have shown a circular saw 1 having left and right faces 2 and 3 of conventional design. The periphery of this saw carries a plurality of hook-shaped teeth 4, each having the usual gullet 5. While I prefer to spring set the teeth 4, as shown in Fig. 2, others may prefer to utilize an equivalent swage set. In either event, the fact to be remembered is that both spring set and swage set saws cut a kerf having rough sides. Thus, the cant which is cut by the usual circular saw either must be surfaced in a finishing mill or utilized outright in a rough condition.

To effect the production of smooth-surfaced stock with the circular head saw 1, my invention contemplates the provision of a multiplicity of arcuate planer blades such as are shown at 6. These planer blades are utilized in allochiral, mated pairs which are mounted, in matching opposed relationship, upon the opposite faces 2 and 3 of the circular saw. Thus, to the end of providing a detachable mounting for each planer blade, an aligned series of holes first are formed through the body of the circular saw 1. One member of each of the planer blade pairs then is provided with a tapered hole 7 (see Fig. 4) and the other member is provided with a tapped hole 8. These holes, together with the aligned holes through the saw body accommodate a series of securing devices such as the recessed, flush-type screws 9. In this manner, the blades are made easy to install, they are adapted to fit any standard circular saw, and they are made replaceable with a minimum of effort when the planing or shaving edge thereof becomes dull.

Turning now to Figs. 1 and 3, each of the planer blade bodies is bounded by a nonplaner inner face 10 and a plane outer face 11. These faces 10 and 11 are bounded by a concave inner margin 12 and a convex outer margin 13, both of which are arranged at oblique angles to the peripheral curvature of the circular saw 1. Each of the inner faces 10 is tapered to a planer-type blade edge 14 adjacent the outer margin 13. Further, to perfect a clean, shaving action, the blade edge 14 and arcuate or convex outer margin 13 are arranged to face at an oblique slicing angle to the direction of travel of the saw 1, such direction of travel being indicated by the arrow 15 in Fig. 1.

Protruding laterally from the inner face 10 of each of the planer blades, are a series of cutter bits 16. I have shown four of these bits upon each planer blade. Further, as shown in Fig. 4, each of these cutter bits abuts the face of the saw which is companion thereto to space the body of the planer blade outwardly from the saw face. The space thus bounded by the saw face, the cutter bits 14, and the inner face 10, I have termed a lateral discharge tunnel 17. Each of these lateral discharge tunnels opens radially in from adjacent the blade edge 14, through the body of the planer blade, to the inner margin 12. Thus, the shavings, cleaning debris such as sawdust and the like, which are collected by the blade edge 14, are fed radially inward, at an oblique angle, through the lateral discharge tunnel 17 to prevent accumulation thereof about the blade edge.

Continuing with the construction of the cutter bits 16, each of these terminates in a point tip 18 lying closely adjacent the blade edge 14. In function then, these pointed tips sever the elongated shaving which is cut by the arcuate blade edge 14. The severed shavings then are fed radially inward through the discharge tunnels 17. Further, as shown in the drawings, I prefer to form the holes 7 and 8 so they penetrate these cutter bits. Thus, each cutter bit also functions as a reinforcing rib to accommodate the flush-type screws 9.

Turning now to Figs. 2 and 3, I have shown a series of relative widths A, B, C, and D, better to point out the important tapered construction of the planer blades 6. Thus, the dimension A indicates the width of the rough saw kerf which is cut by the circular saw teeth 4, the width B indicates the thickness between the rearward or outward margins of each mated pair of blades, the dimension C indicates the forward or most inward thickness, and the dimension D indicates the thickness through the base of each pair of planer blades. The dimensions A and B are substantially equal, whereas the dimension C exceeds the dimension B by a slight amount. Further, the dimension C exceeds the dimension D. Thus, each of the planer blades 6 is tapered longitudinally from end to end (B to C) in a radially inward direction from a width substantially equal to the peripheral tooth set width A to a slightly greater width C. Further, each of the mated pairs of planer blades is tapered from a given overall thickness C, adjacent the blade edge 14, to a smaller thickness D adjacent the opposite edge thereof. The importance of these tapers will become obvious as the function of the planer blades is described.

Better to illustrate the operation of my invention, I have shown (see Fig. 2) a rough saw kerf 19 and a smooth saw kerf 20 as they are formed by a circular saw carrying the planer blades 6. Thus, the spring set teeth 4 cut a conventional rough saw kerf 19 having an approximate width A. It is this rough saw kerf 19 which the planer blades of my invention clean and shave to produce a smooth surface cant or stock as indicated by the smooth-sided saw kerf 20. Progressing radially inward from the teeth 4 toward the saw collar (in the direction in which the work is fed to the saw), the initial rough cut is made by the teeth 4 and a majority of the saw-dust therefrom is collected in the gullets 5. Thereafter, the rear or outermost portion of the arcuate blade edge 14 (of dimension B) engages the kerf to begin a cleaning and planing operation. Since the base or forward end of the planer blade is of substantial width (as shown at C), the kerf is widened and smoothed as the work is fed to the saw. Intermediate the dimensions B and C, and after the small dimension B begins to clear the kerf, the blade edge 14 begins to slice a thin shaving from the kerf. At the same time, the pointed tips 18 upon the cutter bits 16 cut this shaving into small parts or elements which are less likely to clog up or intertwine with other shavings. Thereafter, the cut shaving and the excess sawdust or other cleaning debris is fed radially in through the series of discharge tunnels 17. These discharge tunnels are of vital importance since previous attempts to plane while sawing often have jammed the shavings and sawdust tight against the blade and prevented the continuous operation thereof. That is to say, were the discharge tunnels 17 not provided, the shavings and sawdust would accumulate and jam up, under intense feed pressure, to require a cleaning of the planer blades after but a short time. With my novel tunnels 17, however, this debris is fed away from the blade edge 14 to a point where it will discharge as the saw leaves the wood.

From the above description, it will be evident that I have provided a novel arcuate planer blade for use with a circular saw in cutting a smooth-surfaced kerf. This blade is easy to install and remove and is simple in construction and operation so the typical small sawmill operator in the Pacific Northwest Douglas fir region can produce smooth-surfaced timbers at a minimum expense. Further, because of the tapered arc and oblique angle construction of the blade, a clean kerf is produced. In combination therewith, the cutter bits and lateral tunnels serve a needed function in the subdividing and discharge of the shavings produced by the planing action. Thus, the small "gyppo" sawmills of this region will derive an increased profit from their operation, and will be better able to survive the competition of the giants of the industry.

I claim:

1. In combination with a peripheral toothed circular saw, a multiplicity of planer blades spaced circumferentially about said saw, said planer blades being arranged in mated, allochiral pairs with the blades of each pair lying against the opposite faces of said saw, and a plurality of lateral guideways bounded by the body of each planer blade and the saw face companion thereto, each said planer blade being tapered longitudinally in a radially inward direction from a width substantially equal to the set width of said peripheral teeth to a slightly greater width.

2. In combination, a circular kerf planing saw having peripheral teeth, a multiplicity of mated pairs of planer blade means secured circumferentially thereto to plane the rough sides of the kerf cut by said peripheral teeth, each said planer blade comprising; an elongated arcuate body having an inner face and an outer face, said inner and outer faces terminating in an obliquely disposed planer-type cutting edge, and a plurality of lateral cutter bits protruding from each said inner face and terminating adjacent said cutting edge to define a series of reinforcing ribs.

3. In combination, a dual-faced circular kerf planing saw carrying a plurality of peripheral teeth, a multiplicity of mated pairs of planer blade means secured detachably to said saw at spaced points located radially inward from said teeth, each said mated blade pair being mounted with one portion thereof against one face of said saw, each individual planer blade comprising; an elongated arcuate body having an inner face and an outer face, said inner and outer faces terminating in an obliquely disposed planer-type cutting edge arranged to face at a slicing angle to the direction of travel of said saw, and a plurality of lateral cutter bits protruding from each of said inner faces and abutting the saw face companion thereto to space said planer blade body outwardly from said companion saw face, said cutter bits being spaced laterally one from another to bound, together with the complementary blade and saw faces, a plurality of lateral discharge tunnels opening radially in from adjacent cutting edge.

4. In combination with a dual-faced circular saw having peripheral teeth, a series of mated pairs of planer blade means secured detachably about the periphery of said saw to plane the rough sides of the kerf cut by said peripheral teeth, each said planer blade comprising; an arcuate body having an inner face adjacent to and overlying one of the saw faces, said inner face being bounded by a concave inner margin and a convex outer margin arranged at oblique angles to the curvature of said circular saw, said inner face being tapered to an arcuate planer-type cutting edge defining said outer margin, a plurality of lateral cutter bits protruding from said inner face and spaced laterally one from another to bound, together with the complementary inner blade face and saw face, a plurality of lateral discharge tunnels opening radially in from adjacent cutting edge, and detachable flush-type means for holding said planing blades to said circular saw.

5. In combination with a dual-faced circular wood saw carrying a plurality of hook-shaped peripheral teeth, a multiplicity of mated pairs of planer blade means secured detachably about the periphery of said saw radially inward from said teeth, each said mated blade pair being secured to said saw faces in matching opposed relationship, each individual blade comprising; an elongated arcuate body having a nonplaner inner face overlying one of the saw faces and a plane outer face opposed thereto, both of said blade faces being bounded by a concave inner margin and a concave outer margin arranged at oblique angles to the curvature of said circular saw, said inner and outer faces terminating in an obliquely disposed arcuate planer-type cutting edge defining said outer margin, said cutting edge and outer margin being arranged to face at an oblique slicing angle to the direction of travel of said saw, a plurality of lateral cutter bits protruding from said inner face and abutting the saw face companion thereto to define a series of reinforcing ribs extending outwardly from said companion saw face, said cutter bits being spaced laterally one from another to bound, together with the complementary blade and saw faces, a plurality of lateral discharge tunnels opening radially in from adjacent said cutting edge, said discharge tunnels being arranged at an inclined slope to the direction of travel of said saw, and a flush-type bolt means piercing each bit to hold said planing blades to said circular saw.

6. A planer blade for use with a circular wood saw, comprising an elongated arcuate body tapered longitudinally from end to end and laterally from side to side, said body having a nonplaner inner face tapered adjacent one margin thereof to define a cleaning and shaving edge of arcuate outline, said inner face carrying a plurality of protruding lateral cutter bits arranged at an oblique angle to said one margin and terminating adjacent said shaving edge, each said cutter bit extending across a planer blade in a straight line, and a pointed tip arranged adjacent the cleaning and shaving edge of each said cutter bit.

7. A planer blade for use with a circular saw, comprising an elongated arcuate body tapered longitudinally from end to end and laterally from side to side, said body having a plane outer face and a nonplaner inner face, said inner face terminating in a tapered margin defining a plane-type cutting edge of arcuate outline, said inner face carrying a plurality of protruding lateral cutter bits terminating immediately adjacent said cutting edge, each said cutter bit extending across a planer blade in a straight line along said inner face and terminating in a pointed tip, said cutter bits being spaced longitudinally one from another to bound a plurality of lateral discharge tunnels open to both margins of said body, each said cutter bit projecting out from said inner face and at least two of said bits carrying means detachably for securing said body to said saw.

8. A planer blade, comprising an elongated arcuate body tapered longitudinally from end to end and laterally from side to side, said body having a nonplaner inner face tapered adjacent one margin thereof to define a plane-type cutting edge of arcuate outline, said inner face carrying a plurality of projecting lateral cutter bits terminating adjacent said cutting edge, said cutter bits being spaced longitudinally one from another to bound a plurality of lateral discharge tunnels open to both margins of said body to discharge debris.

HERVEY G. MARVIN.

References Cited in the file of this patent

UNITED STATES PATENTS

| Number | Name | Date |
|---|---|---|
| 60,827 | Bee | Jan. 1, 1867 |
| 175,540 | Whitaker | Mar. 28, 1876 |

FOREIGN PATENTS

| Number | Country | Date |
|---|---|---|
| 20,025 | Denmark | Mar. 29, 1915 |